Dec. 12, 1939.　　　　　　　E. CZAPEK　　　　　　2,183,255
APPARATUS FOR THE MANUFACTURE OF CELLULOSE FILM OR FOIL WEBS AND THE LIKE
Filed Feb. 1, 1939
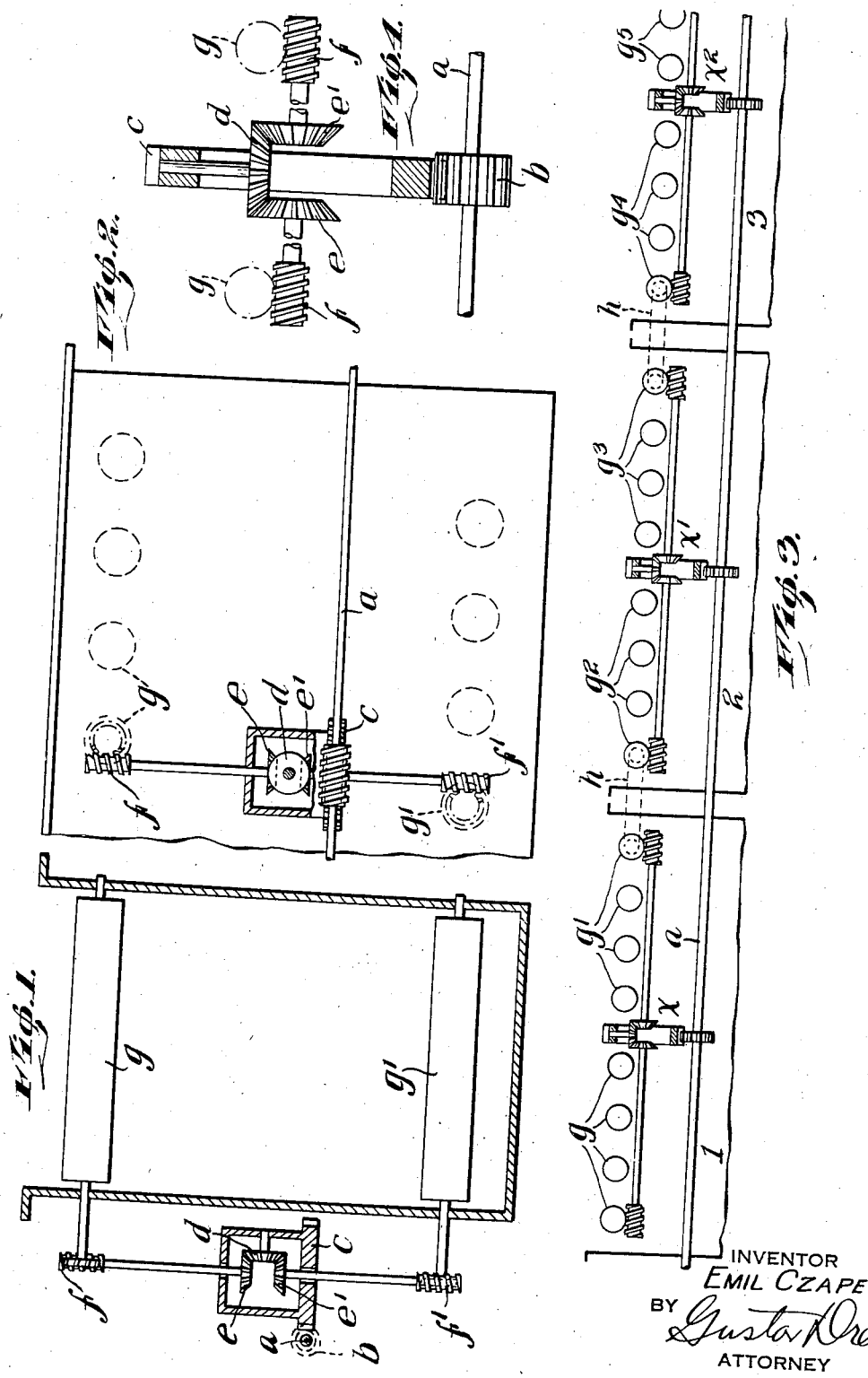
INVENTOR
EMIL CZAPEK
BY Gusta Drews
ATTORNEY Patented Dec. 12, 1939

2,183,255

UNITED STATES PATENT OFFICE 2,183,255

APPARATUS FOR THE MANUFACTURE OF CELLULOSE FILM OR FOIL WEBS AND THE LIKE

Emil Czapek, Berlin, Germany, assignor to Guaranty Trust Company of New York, New York, N. Y., a banking corporation of New York Application February 1, 1939, Serial No. 253,961
In Great Britain December 17, 1936

2 Claims. (Cl. 18—15)

This invention relates to apparatus for the production of film or foil webs from solutions of cellulose or cellulose derivatives as disclosed in part in my co-pending application Serial No. 116,290 filed Dec. 17, 1936.

In the continuous production of endless film webs from solutions of cellulose or cellulose derivatives, in which said webs are passed through baths for the purpose of further treatment, various attempts have been made to construct regulators, which vary the peripheral speed of the conveying means or guide drums depending on the varying shrinkage of the film webs, in order to prevent the tearing of the thin film webs.

Such regulators however depend for their operation upon indicators or relays, which generally only give warning of the lack of uniformity in the stresses occurring in the film webs after the shrinkage has taken place, so that the resulting adjustment takes place too late.

The present invention aims at obviating the foregoing drawbacks.

To this end, according to the invention, those guide drums, which carry the web at the places where stresses leading to shrinkage or elongation of the web occur, are not rigidly connected to a common drive but are driven from a common source of power through differential gearing so as to equalise any inequalities arising out of irregular stresses in the web.

This can be achieved in a simple and convenient method by connecting the driving shaft to different guide drums or groups of guide drums through differential gearing interconnecting two or more guide drums or groups of guide drums. Those groups of drums in which no irregular stresses are liable to be set up can be driven directly from the driving shaft and only those groups of guide drums in which irregular stresses are liable to be set up are driven through interposed differential gearing.

When the cellulose film passing over the guide drums is not subjected to any intermediate irregular shrinking or stretching, all the drums rotate at the same speed or at a constant difference in speed. Moreover correlated sets of guide drums, where intermediate stresses cannot occur, are combined in one group and the differential drives on the driving shaft are provided for the transitions from group to group where the differences in shrinkage or elongation occur.

If due to the irregular stresses, a retardation or an acceleration of the film web occurs in one group relatively to the other, the differential gear will be caused to respond thereto at the very beginning of this difference, owing to the resulting sagging or tightening of the film web, and thus to restore the previous condition.

Thus, should such irregular difference take place at any point, the film commences to stretch and thus immediately to impose more resistance on the conveyor drum or drums over which it is passing, but owing to this incipient elongation less resistance is imposed on the next conveyor drum or drums as a result of which the speed of rotation of the first mentioned drum or drums decreases, while the speed of the latter drum or drums increases until the previous equilibrium is restored.

By increasing the speed or acceleration of the drum or group of drums driven from one side of the differential gear in conjunction with a relative reduction in the speed of the corresponding drum or group driven from the other side of the differential gear any stretching or shrinkage of the film web is fully compensated for.

In order that the invention may be more clearly understood, reference is made to the accompanying drawing, which illustrates diagrammatically and by way of example, two embodiments thereof, and in which:

Fig. 1 is a part sectional end elevation; and

Fig. 2 is a part sectional side elevation, of one embodiment;

Fig. 3 is a part sectional side elevation of another embodiment; and

Fig. 4 is a detail.

In Figs. 1 and 2, the differential gear is interposed between the first of the upper row of rollers or drums and the first of the lower row of rollers. $a$ is the driving shaft, on which is fixed a worm $b$ driving the toothed pinion $c$. Integral with $c$ is the differential housing, in one side of which is fixed a stub axle on which is loosely mounted the differential bevel pinion $d$ which drives the bevel pinions $e$ and $e_1$ in known manner, the drive being transmitted through the respective shafts, on which are mounted worms $f$ and $f_1$ respectively, to pinions mounted on the rollers $g$ and $g_1$ respectively.

A similar arrangement may if necessary, be interposed between succeeding members of the upper and lower series of drums. The purpose of this arrangement is to compensate for any sagging or tightening of the film web between the upper and lower rollers, in order to avoid elongation or tearing of the thin film web.

In Fig. 3, three treating tanks 1, 2 and 3 are shown, each of which is provided with a series of rollers of which only the upper series is shown.

In tank 1, the first group of four rollers $g$ is driven from the common driving shaft $a$ via one side of the differential gear $x$, whilst the remaining group $g_1$ is driven from the other side of $x$. The drive in the other tanks 2 and 3 is effected in a similar manner by means of the differential gears $x_1$ and $x_2$ respectively, driving the two groups of rollers $g_2$ and $g_3$ in tank 2 and groups $g_4$ and $g_5$ in tank 3 respectively. This arrangement will compensate for any sagging or tightening of the film web while passing from group $g$ to group $g_1$, in tank 1, and it has the same effect for the respective groups in tanks 2 and 3.

If necessary, the last roller in tank 1 can be coupled up to the first roller in tank 2 by means of a differential gear $h$ shown diagrammatically, and the same connection $h$ also shown diagrammatically may be made between tanks 2 and 3, so as to compensate for shrinkage or stretching of the film while passing from one treating tank to another.

In Fig. 3 only one of each group of rollers is shown as being driven by a worm on the differential driving shaft for the sake of clearness, but obviously each roller is similarly driven.

Fig. 4 is a detail on a larger scale, of the form of differential gear employed in the embodiment of Fig. 3.

Having now particularly described and ascertained the nature of my said invention and in what manner the same is to be performed, I declare that what I claim is:

1. An apparatus for the production of film or foil webs from solutions of cellulose or cellulose derivatives comprising a treatment bath, two spaced guide rollers associated with the treatment bath for advancing successive parts of the film through the bath, a drive, and differential gears between said spaced guide rollers connecting the successive guide rollers to said drive whereby when the shrinkage in the film varies while passing from one guide roller to the other the advancing speed of the successive rollers will be compensated to correspond to such variations.

2. An apparatus for the production of film or foil webs from solutions of cellulose or cellulose derivatives comprising a treatment bath, successive rotatable feeding means associated with the bath over which the film is adapted to pass for advancing successive parts of the film through the bath, a drive, and a differential between the successive feeding means connecting these successive feeding means to said drive.

EMIL CZAPEK.